United States Patent [19]

Mizer et al.

[11] Patent Number: 4,792,057

[45] Date of Patent: Dec. 20, 1988

[54] METHOD AND APPARATUS FOR DISPENSING FLAT DISCS

[75] Inventors: Frank A. Mizer, North Olmstead; George J. Coghill, Bratenahl, both of Ohio

[73] Assignee: The Franklin George Co., Inc., Cleveland, Ohio

[21] Appl. No.: 764,765

[22] Filed: Aug. 12, 1985

[51] Int. Cl.[4] .............................................. B65G 59/00

[52] U.S. Cl. .................................... 221/187; 221/260; 221/262; 221/270; 221/272; 221/281; 221/276; 453/44

[58] Field of Search ............... 221/186, 187, 190, 260, 221/262, 268, 270, 272, 281, 276, 274, 297, 298; 133/5 A, 6, 5 R; 453/49, 39, 44, 45

[56] References Cited

U.S. PATENT DOCUMENTS 2,520,321 8/1950 McDonald et al. ............ 221/276 X 3,471,056 10/1969 Kovac ............................ 221/276 X 3,998,238 12/1976 Nigro ............................ 221/297 X 4,216,878 8/1980 Naud ............................ 133/5 A X 4,413,750 11/1983 Morrone et al. ................. 453/49 X 4,541,547 9/1985 Miknyocki et al. ............ 133/5 R X

FOREIGN PATENT DOCUMENTS 100533 12/1940 Sweden .............................. 221/260

*Primary Examiner*—Joseph J. Rolla

*Assistant Examiner*—David H. Bollinger

*Attorney, Agent, or Firm*—George J. Coghill

[57] ABSTRACT

An apparatus for dispensing single ones of flat chips or discs from a multi-chip receptacle, and/or depositing them onto a surface at selected locations, is disclosed, as may be desireable, for example, when playing a game of bingo. In one preferred embodiment the chips are dispensed and deposited onto the surface in response to a downward motion or force on the apparatus against the surface after it is properly positioned at the selected location.

66 Claims, 6 Drawing Sheets

Fig. 4
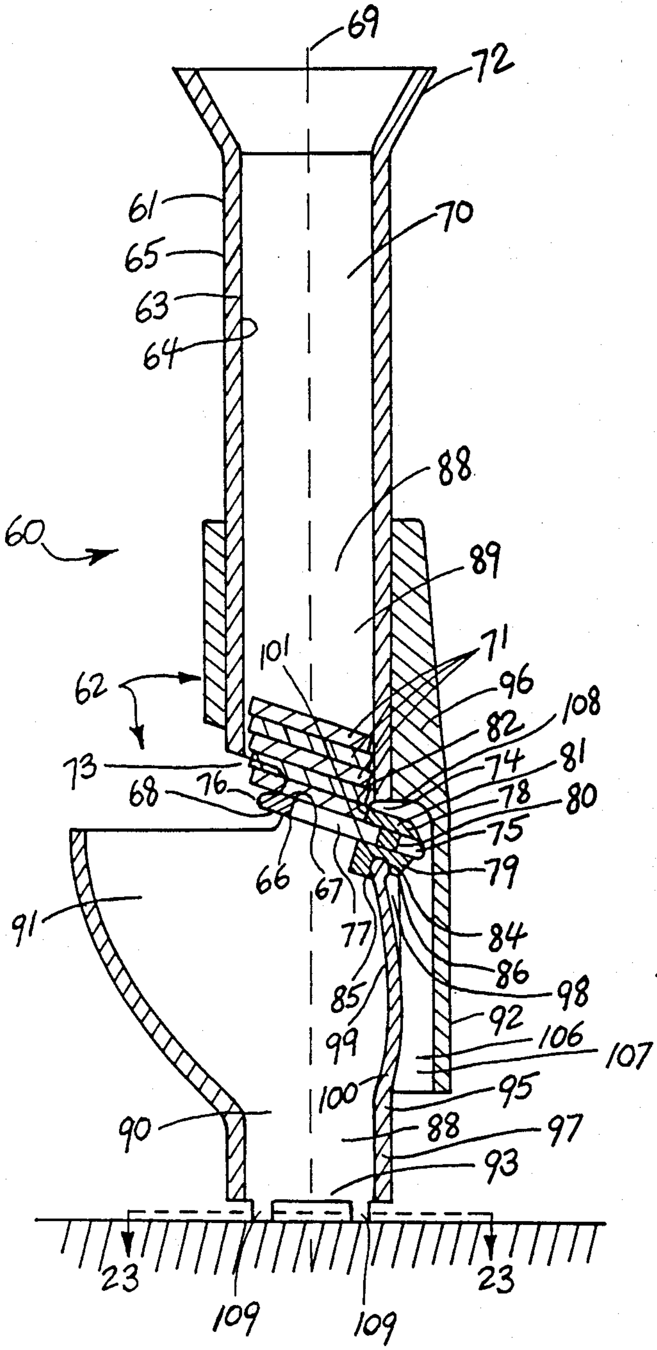
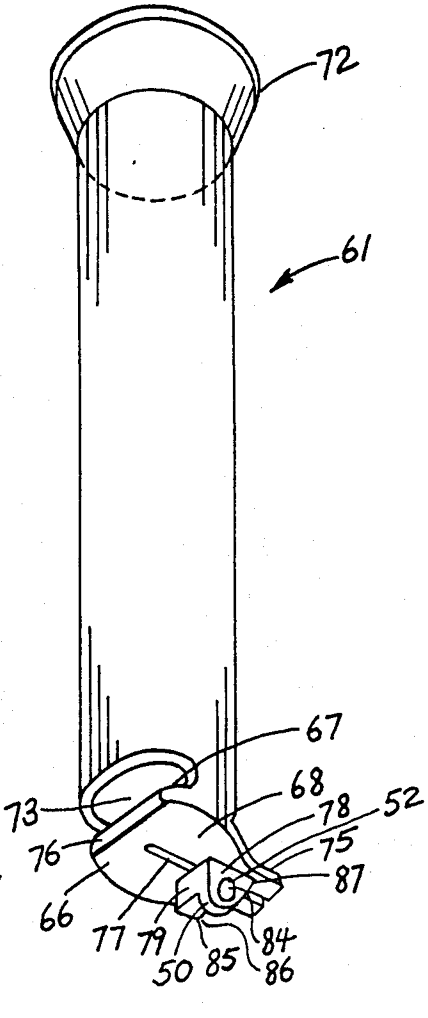
Fig. 5

METHOD AND APPARATUS FOR DISPENSING FLAT DISCS

BACKGROUND OF THE INVENTION

1. Field of the Invention

This invention relates generally to the field of dispensers, and more particularly relates to the field of hand held dispensers for flat discs, such as bingo chips.

2. Description of the Prior Art

Bingo, in general, as is well known, is played with cards having a grid of squares on them and with numbers in each square. Numbers are randomly selected or "called" and when a called number corresponds to one on a player's card, that player places a small chip or marker on the square having that number. When a player's card has five chips aligned, either horizontally, vertically, or diagonally, on numbers that have been called, that player wins the game.

For the person playing one card, it is relatively easy to pick a chip from a box for example, and place it on the proper square with more than enough time to enjoy the game leisurely. However, bingo is getting ever more popular and it is happening that some players attempt to play more than one card at a time, even as many as five to ten or more. When playing more than one card at a time, it becomes more difficult to place the chips on the card in the proper position easily, without error, especially when the same number might be on several ones of the cards being played at the time. Until the present invention, the only generally well accepted way of placing the chips on the card was manually with the fingers, sometimes picking the chips out of a box one at a time, or sometimes holding many chips in one hand and placing them on the cards with the other. Perhaps other variations have been attempted, but with any of the manual methods, the process was awkward.

There has, in the past, been attempts to make devices that would hold multiple chips and dispense them one at a time directly onto the playing surface, but they have not achieved acceptance, variably because either they were hard to load, would interfere with chips already placed on squares adjacent to the one to be marked, would require special chips that were not accepted, or for other reasons.

SUMMARY OF THE INVENTION

The present invention relates to an improved apparatus for, and method of, dispensing chips or flat discs one at a time. In a preferred embodiment, the chips can be dispensed one at a time directly onto a surface at a particular desired location, such as a bingo card.

The apparatus comprises a receptacle to hold multiple ones of the chips in a stack along a vertical axis extending generally centrally of the device. The stack of chips is supported on a floor of the receptacle which is generally flat. Additionally, but variably in different embodiments, the apparatus comprises: an upper-side of the floor and/or an under-side of the floor, either or both of which may advantageously be angled from the perpendicular with respect to the axis of the stack of chips; a displaceable slide member or housing moveable with respect to the receptacle; a shuttle, moveable along the floor in response to a predetermined movement of the slide member for displacing, laterally with respect to the axis, the bottom most chip in the stack through an exit opening in the sidewall of the receptacle adjacent to the floor; a pusher member operative to move said shuttle in response to motion of the slide; and a passageway in communication with the exit opening, which may include a chute, for guiding a chip from the exit opening to a bottom opening through which the chip passes to be deposited on the surface. Narrow prongs can be distributed around the bottom opening to help prevent the apparatus from disturbing chips already positioned at other locations closely proximate to the desired location on the surface.

The method variably comprises the steps: of loading a receptacle with a supply of multiple chips or discs in a stack along an axis and supported on a floor having an upperside and underside surface, either of which surfaces are angled from the perpendicular with respect to the axis; predetermining a particular location on a surface at which to place a chip; positioning a bottom opening over said predetermined location; placing in contact with the surface multiple prongs distributed around the bottom opening; moving the displaceable slide member; displacing a shuttle and a pusher; displacing the bottom chip in said stack laterally of the axis and/or upwardly; and/or guiding the displaced chip through and out of said bottom opening.

In a preferred embodiment, the motion of the slide with respect to the receptacle is in a vertical direction, and is effected by downward force exerted on the device against the surface that is to receive the chip. The chip is displaced by pushing on the lower edge of the bottom chip.

In other embodiments of the invention, alternate approaches to various ones of the elements and steps are disclosed. The inventive aspects can be more fully understood with reference to the following Description of the Preferred Embodiments and the Drawing Figures wherein:

BRIEF DESCRIPTION OF THE DRAWINGS

FIG. 4 is a cross sectional view of a second preferred embodiment of a chip dispenser;

FIG. 5 is a bottom angled isometric view of just a receptacle member as used in the apparatus of FIG. 4;

DESCRIPTION OF THE PREFERRED EMBODIMENTS

Figure 1:
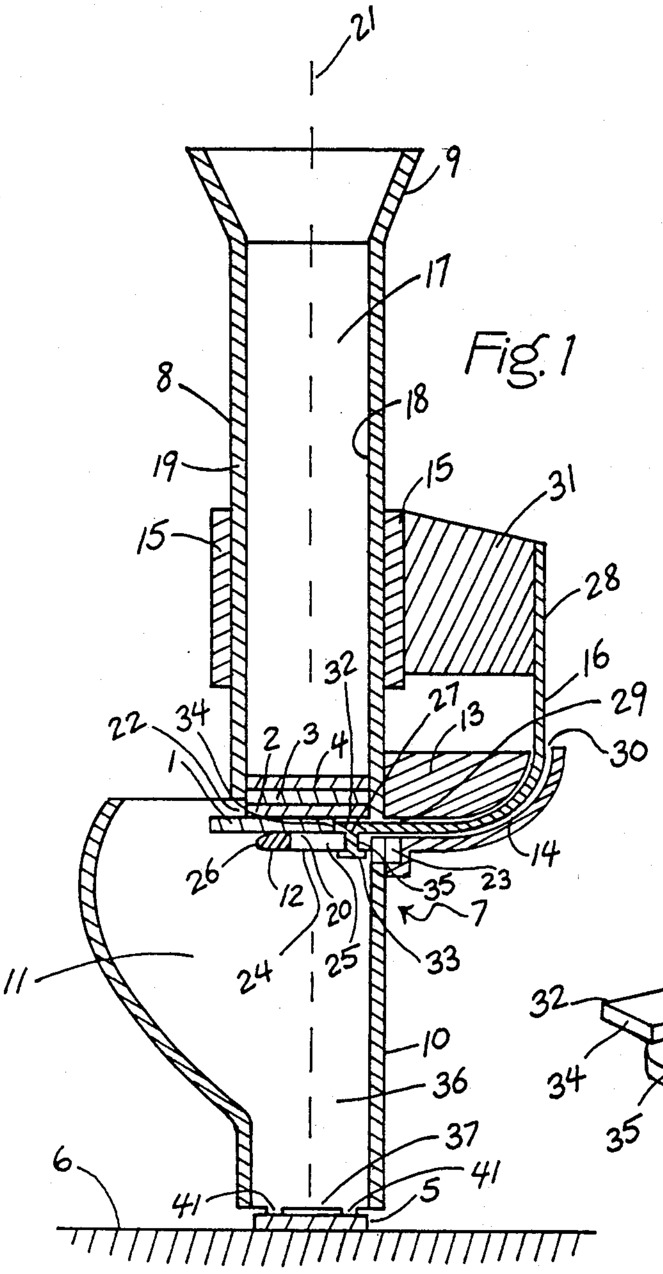
FIG. 1 is a cross sectional view of a chip dispenser.

FIG. 1 depicts a first embodiment of a hand held dispenser for flat discs or chips 1,2, 3, 4, and 5, one at a time, onto a flat surface 6. It generally comprises a housing 7 having a tubular upper housing receptacle portion 8 with an open funnel top 9, and a lower housing chute portion 10 having a passageway 11 therein. The upper housing portion 8 and the lower housing portion 10 are separated by a floor 12. This dispenser also comprises an intermediate flange 13 extending radially outwardly at an intermediate location proximate the floor 12 between the upper housing receptacle portion 8 and the lower housing chute portion 10 and having a channel 14 therein. A tubular displaceable slide member 15 is slideably retained around the upper housing portion 8 and has a thin elongated pusher 16 attached thereto and extending into and through the channel 14 of the intermediate flange 13.

The upper tubular housing 8 has an elongated cylindrical chamber or cavity 17 therein partially defined by a radially inner surface 18 of a sidewall 19 and partially defined by a flat upperside surface 20 of the floor 12 at a bottom portion thereof. The chamber 17 comprises a receptacle for retaining chips in a vertical stack along a central axis 21 of the chamber 17 and the device generally. The sidewall 19 of the chamber 17 has an exit opening 22 at a first angular position about the axis adjacent and just above the upperside surface 20 of the floor 12 with sufficient height along in the direction of the axis 21 and extending around the sidewall 19 sufficiently such that a chip can pass therethrough laterally of the axis 21. On the opposed side of the sidewall 19, adjacent and extending above the upperside surface 20 of the floor 12, is a recess 23.

Figure 3:
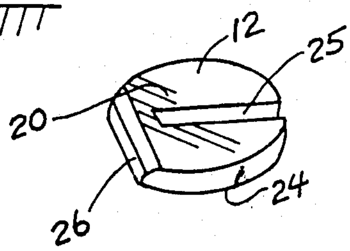
FIG. 3 is an isometric view of the floor at the bottom of the chip receptacle in the apparatus of FIG. 1.

As can be best appreciated by combined reference to FIGS. 1 and 3, the upperside surface 20 of the floor 12 is flat, and the floor 12 also has a flat underside surface 24, both surfaces 20 and 24 being parallel to each other. The floor 12 has an elongated slot 25 in it, extending generally in the direction between the recess 23 and exit opening 22 in the sidewall 19. In this embodiment, the slot 25 extends part way across the floor 12 toward the exit opening 22 (toward the left side as depicted), terminating short of an edge 26 of the floor 12 proximate the exit opening 22.

Referring back now to FIG. 1, the channel 14 in the intermediate flange 13 is elongated between two ends 27 and 28, and extends in smooth contour along the distal and lower edge of the flange 13. The intermediate flange 13 is formed with or secured to the sidewall 19 (right side as depicted) such that a first end 29 of the channel 14 aligns with and is open to the recess 23 in the sidewall 19 and hence open to the interior of the device adjacent and just above the floor 12, and in general alignment with the slot 25 therein. The second end 30 of the channel 14 is open at an upper distal corner of the intermediate flange 13.

The tubular displaceable slide member 15 can partially or completely encircle, or otherwise be slideably retained around or to, the outside of the upper housing portion 8. In this embodiment, the slide 15 is concentric with the axis 21 and the housing 7, and is slideably moveable with respect to the housing 7 (up and down as depicted) in the direction of the axis 21 of the device, between an upwardmost retracted operative position and a lowermost extended operative position. As depicted in FIG. 1, the slide member 15 is at an intermediate location between the two positions. A slide flange 31 is attached to or formed with the slide 15 at one angular location. The slide flange 31 has a radial extension from the axis 21, and is angularly positioned about the axis 21, so as to be in angular alignment with the open second end 30 of the channel 14 in the intermediate flange 13 at its upper distal corner.

As briefly noted above, attached to the slide flange 31 is an elongated, somewhat rigid but yet flexible, flat pusher 16 (see FIG. 2 also), complimentary in shape to the channel 14 in the intermediate flange 13 and freely slideable therein. The pusher 16 extends downward from a first end 28 at the radially distal edge of the slide flange 31, and into the channel 14 in the intermediate flange 13 and continues through the channel 14 to a second end 27 thereof, distal to the slide flange 31. The distal second end 27 of the pusher 16, emerges through the recess 23 of the sidewall 19 adjacent and above the floor 12 on the interior of the device.

Figure 2:
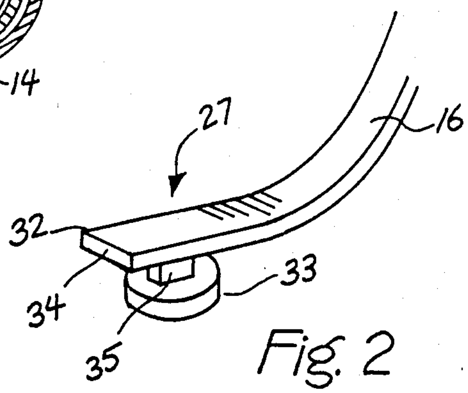
FIG. 2 is an isometric view of one end of a chip-pusher member used in the apparatus of FIG. 1.

FIG. 2 shows the second end portion 27 of the pusher 16 that is interior of the device, and a small portion of the elongated extension of the pusher 16 back therefrom. The extension portion of the pusher 16 is generally flat and broader than the cross dimension of the slot 25 in the floor 12. The second end 27 of the pusher 16 comprises a shuttle having an upper portion 32 and a lower portion 33. The upper portion 32 of the second end 27 of the pusher 16 has a leading upper edge 34 which has a height from the floor 12 less than or equal to the thickness of the chips to be dispensed, and which is moveable in response to movement of the slide 15 between a retracted operative position in the recess 23 of the sidewall 19 (to the right in FIG. 2) when the slide 15 is in its retracted position, and an extended operative position at the end of the slot 25 in the floor 12 (to the left in FIG. 2) when the slide 15 is in its extended position. The shuttle is formed with the pusher 16, and therefor operatively engages and is attached thereto. The bottom surface of the upper portion 32 of the shuttle end 27 of the pusher 16 engages and is slideable across the upperside surface 20 of the floor 12. The lower portion of the shuttle end 27 of the pusher 16 comprises a connecting flange 35, extending downward therefrom, which snugly but moveably fits into and is retained in the slot 25 in the floor 12. The connecting flange 35 has an enlarged bottom portion which engages the underside 24 of the floor 12 to keep the upper portion 32 of the shuttle end 27 of the pusher 16 aligned with the floor 12, with the connecting flange 35 positioned in the slot 25 of the floor 12.

With the slide member 15 in its upward most position, the shuttle end 27 of the pusher 16 is retracted radially outward from the axis 21 of the tubular upper portion 8 of the housing 7, so that the leading edge 34 of the shuttle end 27 of the pusher 16 is in the recess 23, radially outside and beyond the inner surface 18 of the sidewall 19 and the outermost edge of the bottom chip in the receptacle 8 so that the bottom chip can rest flatly on the floor 12. With the slide 15 in its downward most position, the shuttle end 27 of the pusher 16 will have been displaced along the floor 12 to a position almost to the edge 76 thereof.

The lower portion of the device has a hollow enclosed protruding chute passageway 11 below the floor 12, radially displaced from the axis 21 of the device, which funnels back to said axis 21 in a downward progressing direction, and has on opening 37 at the bottom thereof aligned with the axis 21 for chips to pass thereoutof onto a surface 6.

Multiple (4) thin prongs 41 are formed or otherwise rigidly attached in a distributed arrangement around, radially adjacent, and below the bottom passageway opening 37 and are adapted to contact the surface 6 onto which a chip is to be deposited at distributed points therearound. These prongs 41 will be more fully discussed with reference to the device of FIG. 4.

The housing 7 can be made from any suitable plastic, and can be made in two halves, symetrical with respect to the plane of the page as depicted in FIG. 1, and snapped or otherwise bonded together after the pusher 16 is properly positioned in the channel 14 of the intermediate flange 13.

In use, multiple chips are loaded by any convenient method into the open top funnel end 9 of the upper portion 8 of the housing 7 to be supported therein by the floor 12. As the device is lifted by the slide 15 or the flange 31 thereon, gravity (and/or a spring not depicted) causes the slide 15 to move upward on the device until it hits a stop comprising, for example, the bottom of the funnel 9. This upward motion with respect to the device causes the shuttle end 27 of the pusher 16 to be retracted toward and into the recess 23 in the sidewall 19 of the upper portion 8 of the housing 7 beyond the inner surface 18 thereof, thus allowing a chip to rest on the floor 12. The bottom of the lower portion 10 of the housing 7 is manually or otherwise positioned over a location on a surface 6 where it is desired to place a chip. As the bottom of the device, the prongs 41, contacts the surface 6, downward force and movement of the slide 15 operating against the resistance of the surface 6, causes the slide 15 to be moved from its retracted position and eventually to its extended position along the vertical axis 21 of the device, causing the pusher 16 to be forced through the channel 14 of the intermediate flange 13, which thereby causes the shuttle end 27 of the pusher 16 to be displaced toward the axis 21 of the device, eventually engaging the lower edge of the bottom most chip 4, and moving it with sufficient sideways displacement, laterally of the axis 21, to effectively push it toward and through the exit opening 22 into the hollow chute passageway 36. When sufficiently displaced sideways, the chip falls, and is guided by the funnel effect of the chute passageway 36 back toward the axis 21 of the device, and to and out of the bottom opening 37 onto the surface centrally of the prongs 41. After the chip is deposited on the surface 6, the device is picked up by the slide 15 or the flange 31 on the slide 15, and the shuttle end 27 of the pusher 16 is retracted eventually to its radially outward most position ready for the next dispensing cycle.

A second preferred embodiment of the chip dispenser of the invention is disclosed in FIGS. 4 to 12.

FIG. 4 is a cross sectional view of a complete dispenser of the second embodiment. Referring just briefly to FIG. 4, the device comprises a housing 60 which is made up of two major parts: an upper hollow tubular receptacle housing member 61 and a displaceable lower hollow base housing member 62.

FIG. 5 is an angled exterior isometric view of only the upper receptacle member 61 of FIG. 4, and with combined reference to these two FIGS. 4 and 5, the receptacle member 61 itself can be seen to be generally cylindrical for the majority of its length, extending along a generally vertical axis 69, and has a sidewall 63 with a radially inner surface 64 and an outer surface 65. It has a floor 66 at a lower end thereof with a flat upperside surface 67 and a flat underside surface 68. It has an elongated chip receiving cavity 70 for receiving and retaining multiple flat chips 71 in a vertical stack along the axis 69. The cavity 70 is defined by the inner surface 64 of the side-wall 63 and the upperside surface 67 of the floor 66, and has has an open funnel shaped top 72 at an upper end for loading the chips 71.

Although the funnel top 72 is depicted as being formed as one piece with the receptacle 61, it can be made as a separate piece from the receptacle 61 itself and later attached thereto.

The receptacle 61 can be made of a clear plastic material so that a user can see therethrough to determine how many chips may be in the cavity 70 at any given time, and when reloading is necessary.

The sidewall 63 of the receptacle member 61 has a chip exit opening 73 therein adjacent and just above the floor 66, centered at one angular position about the axis 69. This exit opening 73 in the sidewall 63 is large enough in height, and extends around the circumference of the sidewall 63 an amount sufficient to allow at least one chip to be pushed therethrough as will be discussed more fully below.

The sidewall also has a recess 74 therein formed adjacent and just above the floor 66, and centered at an opposed angular position about the axis with respect to the exit opening 73. The recess 74 in this embodiment extends completely through the sidewall 63 of the receptacle housing 61 resulting in an opening therethrough.

The upperside surface 67 and the underside surface 68 of the floor 66 in this embodiment are parallel and angled from the perpendicular with respect to the axis 69 such that the floor 66 slopes upwardly from a rear, less elevated portion proximate the recess 74 in the receptacle housing sidewall 63, to a front, more elevated portion proximate the exit opening 73 in the receptacle housing sidewall 63. The floor 66 extends downward and radially outward from the axis 69 at an angular position just below the recess in the receptacle sidewall 63, and therebeyond, as a flat generally rectangular ledge 75. The floor 66 extends toward the exit opening 73 less than the whole diameter of the chip recieving cavity 70 to a straight forward edge 76 beveled at its top. It is noted that the floor 66 could extend forwardly to or even beyond the sidewall 63 without departing from the functioning principles of various aspects of the invention.

The floor 66 also has a straight elongated slot 77 therethrough extending generally in the direction between the recess 74 and the exit opening 73 in the sidewall 63 of the receptacle housing 61. The slot 77 extends to and is open at the rear of the ledge 75. The slot 77 extends forewardly toward the exit opening 73 less than the whole dimension of the floor 66, terminating short of the exit opening 73 and short of the front bevelled edge 76 of the floor 66.

Figure 12:
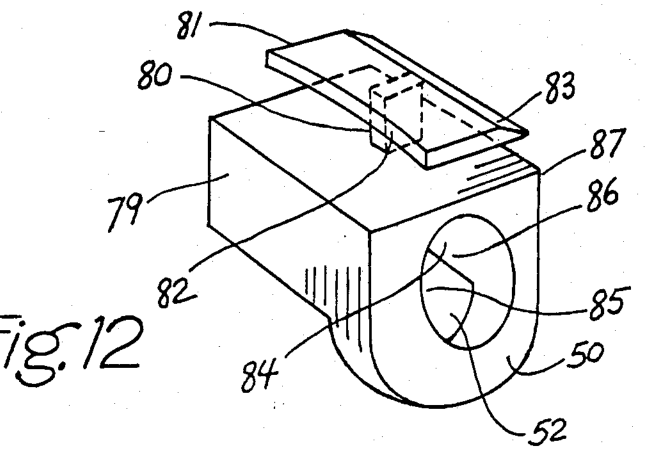
FIG. 12 is an expanded isometric view of a shuttle used in the apparatus of FIG. 4.

A laterally displaceable shuttle member 78, as depicted in FIG. 12, is slideably retained in the slot 77. The shuttle member 78 has a lower base portion 79, a central connecting portion 80, and an upper chip engaging portion 81. The central connecting portion 80 of the shuttle 78 slideably fits into and extends through the slot 77. The upper chip engaging portion 81 is connected to the central connecting portion 80 and extends transversely of the slot 77 by a sideways dimension exceeding that of the slot width such that the chip engaging portion 81 forms flanges which prevent the shuttle 78 from passing through the slot 77 in a downward direction. The lower base portion 79 of the shuttle 78 also has a sideways dimension transverse to the elongated dimension of the slot 77 to likewise form flanges to prevent the shuttle 78 from passing upward through the slot 77 in the floor 66. These upper and lower flanges thereby trap the shuttle 78 in the slot 77. The upper chip engaging portion 81 of the shuttle 78 has a curved front or leading edge 82 generally conforming to the shape of a chip, and has a bevelled top rear edge 83. The leading edge 82 of the chip engaging protion 81 of the shuttle 78 is elevated above the floor 66 with a height less than the thickness of one chip to be dispensed, but sufficient to engage the bottom chip in the receptacle 61 and displace it laterally of the axis 69 and toward the exit opening 73 in the operation as will be discussed more fully below.

The underside of the lower base portion 79 of the shuttle 78 has a rounded groove 84 oriented transversely of the slot 77 in the floor 66 (in its assembled form), forming a forward abutting portion 85, and a rear lip portion 86. The underside of the base 79 of the shuttle 78, just behind the groove 84 is tapered from the rear lip 86 upwardly toward a rear edge 87 thereof. As can be seen in FIGS. 5 and 12, a loop 50 having a central rounded opening 52 aligned with the groove 84 is formed at one end thereof on the underside of the shuttle 78. The loop 50 is attached to the abutting portion 85 of the shuttle at a front location and to the rear lip portion at a back location.

The shuttle 78 is dimensioned so as to be able to pass into and at least partially through the recess 74 in the sidewall 63 of the receptacle housing 61 with the front edge 82 of the upper chip engaging portion 81 aligned with or radially outward of the inside of the inner surface 64 of the receptacle sidewall 63. The shuttle 78 is thus linearly moveable, being slideable in the slot 77, between an extended operative position proximate the exit opening 73 in the receptacle sidewall 63 and front edge 76 of the floor 66, and a retracted operative position with the shuttle 78 at least partially in the recess 74 of the receptacle sidewall 63 and with the front edge 82 of the chip engaging portion 81 of the shuttle 78 in the recess 74 or otherwise aligned with or radially outward of the inner surface 64 of the receptacle sidewall 63.

The base housing 62 of the dispenser of FIG. 4 can be more fully understood by combined reference to FIGS. 4 and 6-9.

Figure 7:
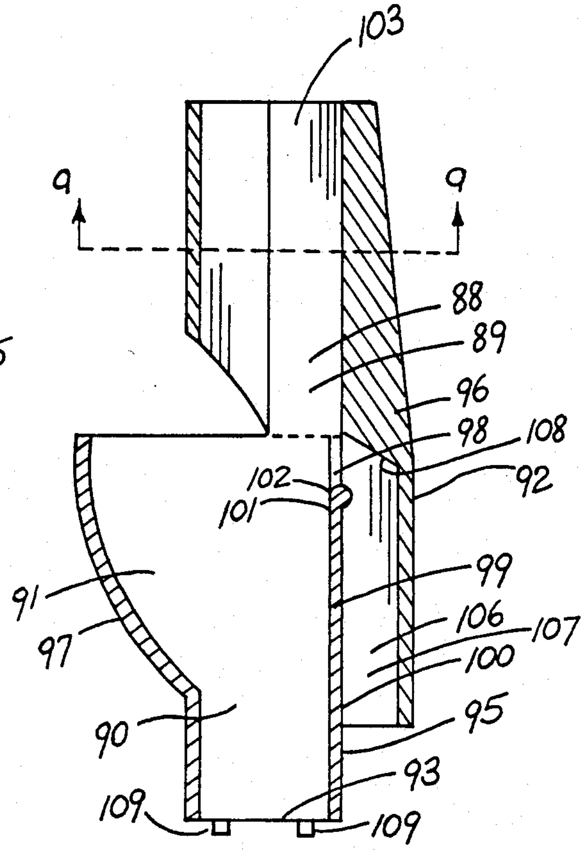
FIG. 7 is a cross sectional view of the lower housing member as used in the apparatus of FIG. 4, and which includes the part depicted in FIG. 6.
Figure 8:
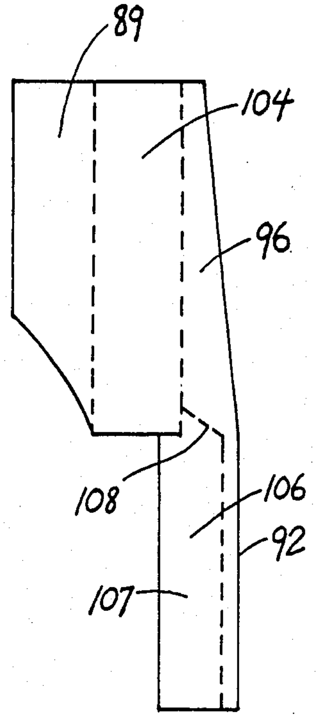
FIG. 8 is an isometric side view of a cover used in the bottom housing of FIG. 7 and FIG. 4.
Figure 9:
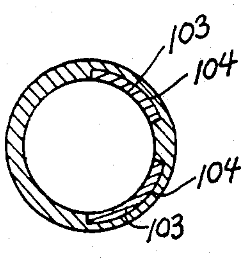
FIG. 9 is a cross sectional view of the housing of FIG. 7 taken in the plane marked 9—9 in FIG. 7.
Figure 10:
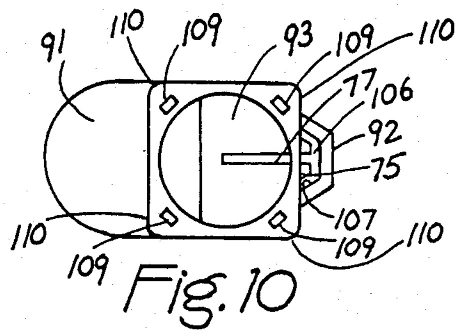
FIG. 10 is an isometric bottom view of the apparatus of FIG. 4.

With particular initial attention to FIG. 7, which is a crossectional view of the base 62 alone and unassembled, the base has a generally cylindrical passageway 88 therethrough, has an upper portion 89 and a lower portion 90 and which is generally concentric and aligned with the axis 69 of the upper receptacle member 61 when assembled, but which has a radially outward extending chute 91 formed at a front part, and a cover 92 at an opposed rear part.

The upper portion 89 of the cylindrical passageway 88 in the base 62 has a inside diameter just larger than the outside diameter of the upper receptacle housing 61, so as to telescopically receive the upper receptacle housing 61 therein and be freely slideably moveable with respect to the receptacle housing 61 in the direction of the axis 69. The lower portion 90 of the passageway 88 in the base 62 has a bottom opening 93 which is generally aligned with and the same radial size as the cylindrical cavity 70 of the receptacle member 61.

The chute 91 is hollow and extends radially outward from a front portion of the base 62 and is angularly aligned with the exit opening 73 in the receptacle housing 61 when assembled, but funnels inwardly back toward the axis 69 as it progresses downwardly toward the bottom opening 93.

Now referring to FIGS. 6-9, it can be seen that the base member 62 can be made for assembly purposes in two parts, namely, a lower chute member 95, and an upper cover member 96. Both parts of the base 62 can preferably be made of a resilient plastic material such as the acetal resin sold under the tradename of Delrin.

Figure 6:
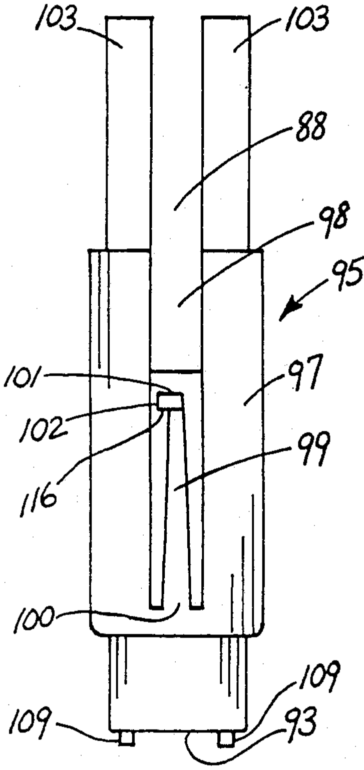
FIG. 6 is a side isometric view of one part of a lower displaceable housing member as used in the apparatus of FIG. 4.

With particular reference to FIGS. 6 and 7, the chute member 95 comprises a wall 97, and the chute 91 at the front as previously described, and has a slot 98 through the wall 97 centered at an angular location about the axis 69 (when assembled) opposed to the angular position of the chute 91. The slot 98 is open at the top and extends downwardly along the wall 97 in the direction of the axis 69 of the device almost to the bottom thereof. The slot 98 is wide enough for the ledge extension 75 of the floor 66 of the receptacle housing 61 to fit freely slideably therethrough, but in somewhat close tolerance therewith.

An elongated flange pusher 99 is formed with the chute member 95 as an extension of the wall 97 thereof, but could be made as a separate piece and be otherwise attached thereto. It is centrally located in the slot 98 in the rear wall of the lower housing and is elongated from a first end 100 attached to the base 61, to a second end 101 distal thereto. Because of the resilient nature of the preferred material of the base member 62 the pusher 99 is also a resilient leaf spring. As can be seen best in FIG. 11, the top distal end 101 of the spring pusher 99 is formed into a rounded shoulder flange 102.

Figure 11:
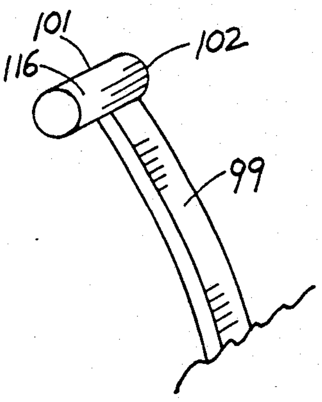
FIG. 11 is an isometric view of a pusher used in the apparatus of FIG. 4.

With combined reference to FIGS. 6 and 11, it can be seen that the rounded shoulder flange 102 has a rounded flange extension 116 thereof which extends outward in at least one direction beyond the sideways dimension of the spring pusher 99 (to the left as view in FIG. 6). This extension 116 freely and rotatably fits into and is retained in the loop 50 on the shuttle 78 when assembled. The interaction of the extension 116 with the loop on the shuttle 78 when assembled helps to maintain the flange 102 of the pusher 99 in proper engagement with the groove 84 in the underside of the shuttle 78.

Referring briefly back to FIG. 4, it can be seen that the rounded shoulder flange 102 pivotally engages and is attached to the groove 84 in the underside of the shuttle 78 and thus slideably engages the underside 68 of the floor 66 therethrough. The pusher 99 is generally aligned with the axis 69 of the receptacle 61 when the base 62 is in its retracted operative position with respect to the receptacle housing 61. It is attached to the displaceable base housing 62 between the bottom opening 93 and the floor 66 of the receptacle housing 61.

The chute member 95 has two wall extensions 103, one on either of two opposed sides thereof. These extensions 103 have a radial thickness approximately one half of the wall thickness of the upper cover member 96, and extend upwardly from a generally central portion thereof. As can best be appreciated with reference to FIGS. 7 and 9, the wall extensions 103 slideably but snugly and securely fit into channels 104 formed on inside walls of the cover 96.

The cover member 96 itself fits partially over the lower chute member 95 as noted above. It has the cover 92 which is a radially outward displaced and downwardly extending projection from a rear portion of the cover member 96, and which, when assembled, fits over the slot 98 area of the chute member 95 of the base 62 for protection purposes. This cover 92 has a clearance channel 106 therein, defined by sidewalls 107, and extending in the direction of the axis 69 of the device from an open distal end at the bottom, to a central location, terminating at an end wall 108.

The bottom-most portion of the base 62 includes multiple pegs or prongs 109 formed with, or otherwise rigidly attached to, the lower housing 62. They are generally longer than the thickness of a particular chip to be dispensed, and are distributed around and radially adjacent and below the bottom passageway opening 93 of the lower base housing 62. In the preferred embodiment, there are four of such prongs 109 generally equally spaced therearound. The prongs 109 are intended to be aligned with the four corners of a bingo space. As can best be seen in FIG. 10, the bottom of the base housing 62 around the bottom opening 93 is "squared" off with corners 110 and the prongs 109 are generally angularly aligned with the "squared" corners 110 to facilitate manual alignment of the prongs 109 with the shape of the playing locations on a bingo board. This bottom most part of the lower base 62 can be made clear so that a user can see that a chip has been properly dispensed.

Referring back now to FIG. 4, in the final assembly, with the receptacle member 61 slideably retained in the base member 62 and at least partially encircled thereby, with the cover member 96 joined with the lower chute member 95, and with the passageway 88 in the base 62 below the floor 66 of the receptacle 61, the spring pusher 99 is aligned with the slot 77 in the floor 66, and the rounded flange end 101 of the spring pusher 99 fits into and operatively engages the groove 84 on the underside of the shuttle 78 in spring tensioned engagement therewith. The rear ledge 75 extension of the floor 66 of the receptacle member 61 freely fits through the slot 98 in the rear wall 97 of the lower chute member 95 and into the channel 106 in the cover 92. The receptacle member 61 is prevented from angular displacement or rotation by slideable close tolerance fit of the ledge extension 75 of the floor 66 through the slot 98 in the lower chute member 95 of the base 62. Displacement of the receptacle member 61 upward with respect to the base member 62 is restricted by eventual contact of the floor extension ledge 75 to the end wall 108 of the channel 106 in the cover 92.

In use, chips 71 are loaded into the top funnel end 72 of the receptacle 61. The flat floor 66 of the receptacle 61 facilitates the proper flat disposition of the chips 71 thereon.

To prepare to place a chip onto a surface, the device is lifted by grasping the receptacle member 61. As thus lifted and held, any substantial downward displacement of the receptacle 61 with respect to the base 62 will result in spring tensioned engagement of the distal end 101 of the pusher 99 with the underside of the floor 66 through the shuttle 78, and this spring tensioned engagement and/or gravity urges the base 62 downwardly with respect to the receptacle 61 to a retracted operative position. Also, the shuttle 78, due to its operative engagement with the pusher spring 99 in the groove 84 on its underside, is urged and held in the recess 74 in a retracted operative position. In this retracted position, the front pushing edge 82 of the shuttle 78 is displaced radially outward into the recess 74, beyond the sidewall 63 of the receptacle 61, and allows a chip to rest flatly on the floor 66 thereof. Furthermore, the flange extension 116 of the pusher 99 can be made to pull on the loop 50 of the shuttle 78 to assist in displacing the front chip engaging edge 82 of the shuttle 78 into the recess, radially beyond the inner wall 64 of the receptacle member.

To actually place a chip onto the surface, the bottom opening 93 is aimed and placed on the surface at the location thereon where it is desired to place a chip, with the prongs 109 in contact therewith at four distributed points around said location. Downward force through the receptacle housing 61 against the surface causes the receptacle 61 and its floor 66 to be displaced downwardly with respect to the base 62 in the direction of the axis 69, or alternatively viewed, causes the base member 62 to be displaced upwardly with respect to the receptacle 61. This downward force and motion displaces the floor 66 toward the pusher spring 99, and because of somewhat rigid but yet flexible nature of the spring 99, and the angle of the floor 66 the distal end 101 of the spring 99 slides along the underside 67 of the floor 66. Thus, the spring 99 is flexed and the distal end 101 of the spring 99 attached to the shuttle 78 is caused to be displaced forwardly (to the right in FIG. 4) toward the chip exit opening 93 in the sidewall 63 of the receptacle 61. The shuttle 78 is likewise displaced from its retracted position toward and eventually to its extended position, in response to the movement of the base 62 with respect to the receptacle 61, due to the engagement of the distal end 101 of the spring 99 in the groove 84 on the underside of the shuttle 78.

The chip engaging edge 82 of the shuttle 78 eventually engages the lower edges of the bottom most chip in the receptacle 61, and further downward force on and displacement of the receptacle 61 and base 62 with respect to each other causes foreward displacement of the chip upwardly with respect to the floor 66 and laterally of the axis 69 therealong toward and eventually through the exit opening 73 in the side wall 63 of the receptacle 61. Still further displacement of the base 62 with respect to the receptacle 61 results in the base 62 being moved to an extended operative position with respect to the receptacle 61 which causes displacement of the shuttle 78 and bottom chip to an extended operative position so far forwardly that the chip is no longer held up by the floor 66, and falls off the forward edge 76 thereof, into the chute 91, and is guided thereby to and out of the bottom passageway opening 93 to be deposited on the surface at the desired location centrally of the prongs 109.

As downward force on the receptacle 61 is relieved when lifting the device, the spring 99 and/or gravity causes the bottom of the prongs 109 on the base 62 to remain in contact with the surface but allows the receptacle 61 and base 62 to move telescopically outward from each other with the receptacle 61 moving upwardly with respect to the surface and base 62, back to a position extended with respect to the base member 62 until the rear floor extension ledge 75 contacts the end wall 108 of the channel 106 in the cover 92, thereby restricting further displacement of the receptacle 61 and base 62 with respect to each other. The interaction of the distal end 101 of the pusher spring 99 against the rear lip 86 of the groove 84 in the bottom of the shuttle 78 and/or the loop 50 thereof causes the shuttle 78 to be returned rearwardly toward and eventually radially outside of the inner surface 64 of the sidewall 63 of the receptacle 61, ready for the next dispensing operation.

In view of the above described functioning of the device, certain structural details can more fully be appreciated.

Figure 23:
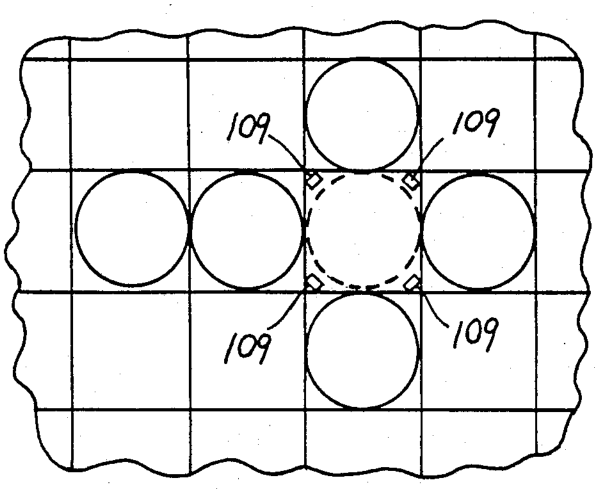
FIG. 23 is a cross sectional view of the apparatus of FIG. 4 taken on the dashed line marked 23—23 therein, and showing the grid of a bingo playing card.

First, by reference to FIG. 23, it can be noted that in playing a game such as bingo, the diameter of standard chips currently being used is substantially equal to and sometimes even greater than the cross dimension of an individual playing rectangle or "square". As noted in FIG. 23, in such a case, the chips have to touch at the edges to line them up in a straight row or column on the game board. The prongs 109 on the bottom of the base 62, as described previously, allows the placement of a chip in between two or more chips that are already placed on the board. The spacial relationship of the prongs 109 to the bottom opening 93 and a square on a bingo board are shown in FIG. 23. When the device is used in an operative position in contact with the surface, even with chips in adjacent squares, the prongs 109 can be aligned to contact the surface so that they are generally angularly aligned with the corners of the playing squares. If the placement or aim is "off center", or if the size of the chips are large in relation to the size of the squares, still, only the prongs 109 can be made to contact the surface and they have sufficient length or height to create a gap between adjacent prongs to allow the edge of the adjacent chips (already placed) to pass freely under the lower base housing 62 in at least a partially overlapping relationship thereto, thus allowing the adjacent chip(s) to remain under the wall of the base 62 without contacting it, and hence without being moved or "tiddly-winked" when the prongs 109 are properly aligned with the "square".

It can also be appreciated that the bottom part of the base 62 around the passageway 88 and the bottom opening 93 is "squared off" with corners 110, and the prongs 109 are generally aligned with the corners 110. This helps to assist the user in aligning the device with the playing "squares", and hence aligning the prongs 109 with the corners 110 thereof.

It is also noted that a similar device could be used for other games or other surfaces having different markings. In such a case there may be a different number of prongs, or the prongs may be distributed differently so as to have another preferred alignment with such markings when used.

Further, the functioning of the prongs 109 and squared corners 110 likewise applies to all of the embodiments disclosed, and to other chip dispensers as well.

The rear of top surface of the shuttle 78 has been bevelled. This has been done in view of certain configurations of bingo chips currently being marketed and presently in wide use. Certain of these chips have a central circular recess on one side. The back edge 83 of the upper part 81 of the shuttle 78 has been beveled so that it will not get caught on this recess and jam the dispenser when the shuttle 78 is returning toward the recess 74.

Further, certain portions of the device can be modified without departing from various of the inventive aspects.

In this regard, but without restricting the contemplated modifications, it is pointed out that the angle of the receptacle floor 66, as can best be seen by referring back to FIG. 4, can be of various inclines. In fact, certain aspects of the invention will function properly within a wide range of angles, even perpendicular to the axis 69 of the device. For example, as will be described more fully below with respect to FIGS. 13-15, the upperside and underside surfaces 67 and 68 of the floor 66 may have different angles with respect to the axis 69, but not without certain trade-offs. With the upperside surface 67 perpendicular to the axis 66, the chips may have a tendency to fall out more easily when the device is tipped toward the chute 91, but the chips tend to rest on the floor 166 of the receptacle 61 more flatly and uniformly, especially with a large number of chips in the receptacle 61. Also, with the underside surface 68 of the floor 66 more perpendicular to the axis, it is more difficult to get the spring 99 and shuttle 78 moving at the beginning of their travel from the recess 74. However, an angle closer to the perpendicular with respect to the axis 69 for the underside surface 68, results in requiring less downward displacement of the receptacle 61 with respect to the base 62 in order to accomplish any given amount of sideways displacement across the floor 66. In the embodiment of FIGS. 4–12, an angle of approximately 18 to 24 degrees for both the upper side and lower side surfaces 67 and 68 of the floor 66 has been found to be acceptable to obtain satisfactory results in view of these various considerations and trade-offs.

Figure 13:
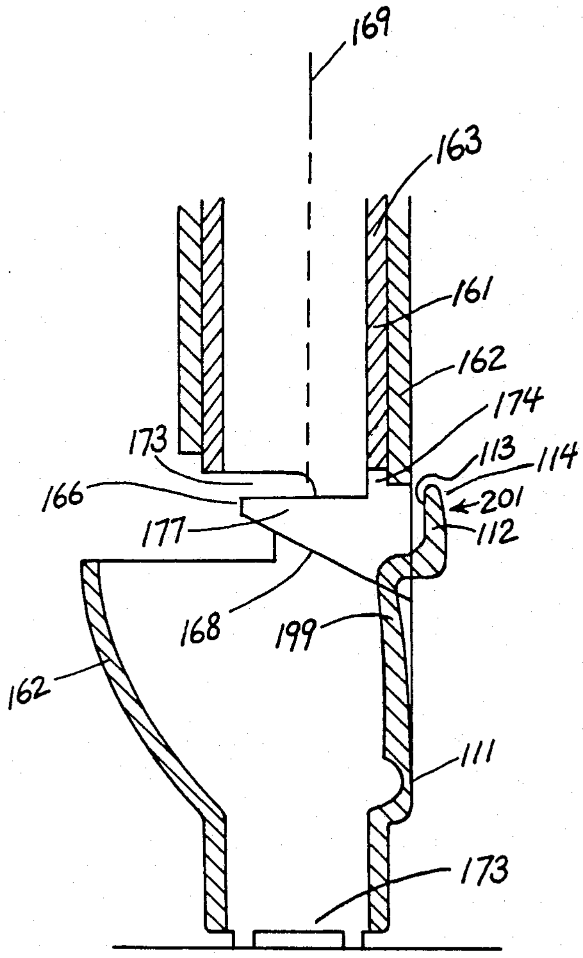
FIG. 13 is a cross sectional view of part of a third alternate embodiment of a chip dispenser.
Figure 14:
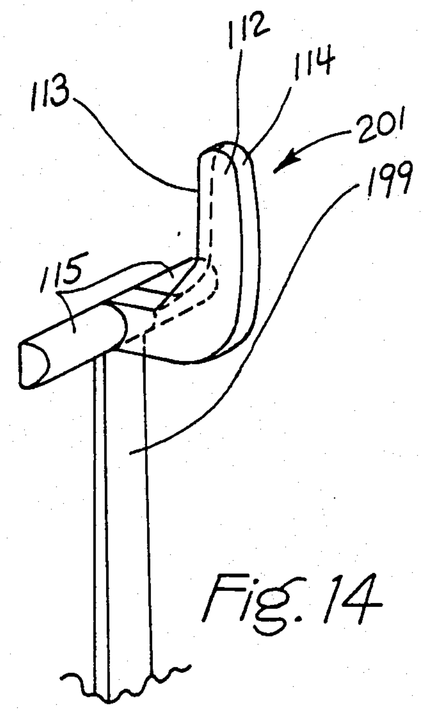
FIG. 14 is an isometric view of a chip-pusher/shuttle used in the apparatus of FIG. 13.
Figure 15:
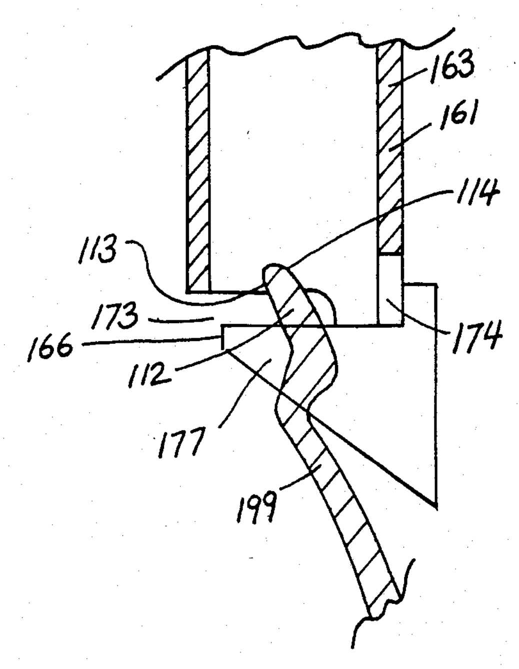
FIG. 15 is a cross sectional view of just the floor area of the apparatus of FIG. 13, in an extended operative position.

As suggested above, FIGS. 13, 14, and 15 show certain modifications that can be made to either the shuttle and floor, the spring, or both. FIG. 13 shows a cross sectional view of the lower portions of a chip dispenser similar to the one of FIG. 4 but with a floor 166 modified so that a leaf spring and shuttle can be combined into one piece 199, and with a modification to the flexing characteristics of the spring 199. FIG. 14 shows an isometric view of the distal end 201 of the leaf spring 199 in FIG. 13; and FIG. 15 shows the relationship of the leaf spring 199 to the floor 166 of the receptacle 161 in an extended operative position.

First it is noted that the device of FIG. 13 can be identical to the device of FIG. 4 with the exception of the shuttle, floor and/or spring as shown.

The leaf spring 199, rather than being of generally uniform thickness for its whole length as in FIG. 4, can be made so that the wall thickness is reduced at a location 111 close to where it meets the displaceable base 161, and thereby to have substantially all of its flexing under tension concentrated at the point 111 of reduced thickness. This configuration of the spring can advantageously reduce the amount of displacement of the receptacle 161 with respect to the base 162 to accomplish a given amount of lateral shuttle displacement toward the exit opening 173 in the receptacle sidewall 163. Other spring configurations and flexing characteristics which are apparent to those skilled in the art can also be used.

Also, but independently, in the device of FIG. 13, the distal end 201 of the spring 199 is the shuttle and thus fixedly and unitarily engaging and attached thereto. As can best be seen in FIG. 14, the distal end 199 of the spring comprises a central flange 112 having a flat front chip pushing edge 113 radially offset outward from the wall of the receptacle 161 and a rounded bevelled opposed rear edge 114. The central flange 112 has dimensions transverse to the slot 177 in the floor 166 as assembled such that it will freely and moveably pass through the slot 177. It has sufficient length so as to pass completely through the slot 177 and therebeyond by an amount approximately equal to the thickness of one chip to be dispensed when in a retracted operative position in the recess 174 in the sidewall 163 of the receptacle 161 and about to engage the edge of the bottom chip. The distal shuttle end 201 of the spring 199 also has rounded shoulders 115 formed on either side of the central flange 112 which extend outward therefrom transversely beyond the edge of the slot 177 to prevent the shoulders 115 and spring 199 from passing therethrough. The shoulders 115 also serve to slide across the underside of the floor 166 when the receptacle 161 is displaced downwardly with respect to the base 162 and hence cause the top of the distal shuttle end 201 of the spring 199 to slide in the slot 177 and along the upperside surface of the floor 166.

The floor 166 of the receptacle 161 has been made thicker at its rearward part adjacent the recess 174 in the receptacle sidewall 163, and tapers to a lesser thickness at its forward part closer to the exit opening 173 in the receptacle sidewall 163. More specifically, the top surface of the floor 166 can be made flat and perpendicular to the central axis of the device. This has the advantage of causing the chips to lay on the floor 166 more uniformly and consistently as compared to an angled floor, especially with a large number of chips loaded into the receptacle 161. As the receptacle 161 is displaced downwardly with respect to the base 162, the shoulders 115 on the distal end 201 of the spring 199 slide across the underside of the floor 166, and the central flange 112 thereby moves from its retracted operative position toward its extended operative position in the direction of the exit opening 173, and the pushing edge 113 of the central flange 112 eventually engages the edge of the bottom chip and displaces it laterally from the axis 169 of the device, similar to the operation of the device of FIG. 4.

As can best be seen in FIG. 15, as the shoulders 115 travel across the underside of the floor 166, the top of the central shuttle flange 112 changes its angular orientation and upward displacement with respect to the top surface of the floor 166. It is pointed out that the angular re-orientation and upward displacement of the shuttle flange 112 with respect to the upper surface of the floor 166 are variously dependent on the shape and dimensions of the shoulders 115, the particular contour of the underside of the floor 166, spring flexing characteristics, and the position of the pushing flange 112 with respect to the spring. In the embodiment just described, the shuttle flange 112 will actually raise higher when being displaced toward its extended operative position proximate the exit opening 173 in the sidewall 163 of the receptacle 161. Many different re-orientations and displacements will be acceptable as long as the pushing edge 113 of the central flange 112 engages only the edge of the bottom chip and displaces it laterally of the axis until it is released. Also it has been found preferable, as depicted in FIG. 15, if the front pushing edge 113 thereof angles so as to be inclined from bottom to top toward the exit opening throughout its displacement across the floor 112 while engaging and displacing the bottom chip. Other shapes and characteristics can be made to function properly, but this shape has been found preferable.

It is also noted that other spring or gravity return mechanisms can be utilized with certain inventive aspects of the device, and thus the leaf spring pusher as described could, for example, be replaced by a hinged arm pusher in various of the devices and need not also serve as the spring return for the receptacle. The pusher could also be made as a separate piece from the base and simply attached thereto.

FIGS. 16–19 show yet another alternate form for the spring/pusher/shuttle arrangement.

Figure 16:
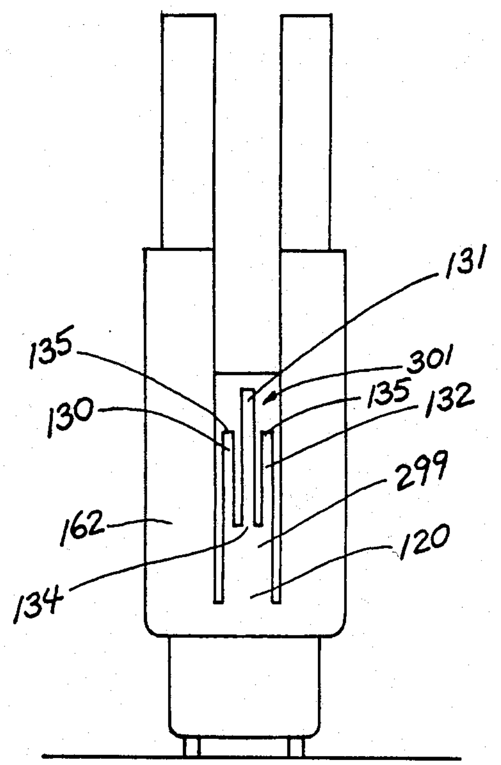
FIG. 16 is a back isometric view of an alternate part for the lower housing of the apparatus of FIG. 4.

As can best be seen in FIG. 16, which is a back view of an alternate base construction, the spring pusher 299 in this embodiment is made such that its end 301 distal to its point 120 of attachment to the base 262 has multiple flanges 130, 131, and 132 extending therefrom. It has three of such flanges: a first elongated central shuttle flange 131 which extends through the slot 277 in the floor 266 by a distance approximately equal to the thickness of one chip to be dispensed (generally enough to engage the edge of the bottom chip in the stack); and second and third shorted projecting flanges 131 and 132 respectively on either side thereof which are separated therefrom along their length down to an intermediate location 134 where they join the central flange 131. The distal ends of the side flanges 132 and 133 comprise shoulders 135 which are adapted to slideably engage the underside of the floor 266 of the receptacle 261 on either respective lateral side of the slot 277, and ride therealong in response to the downward displacement of the receptacle floor 266 with respect to the base 262. If desired, guide channels (not shown) can be provided in the underside of the floor 266 along the slot 277 to help retain the side flanges 132 and 133 in proper alignment therewith.

Figure 17:
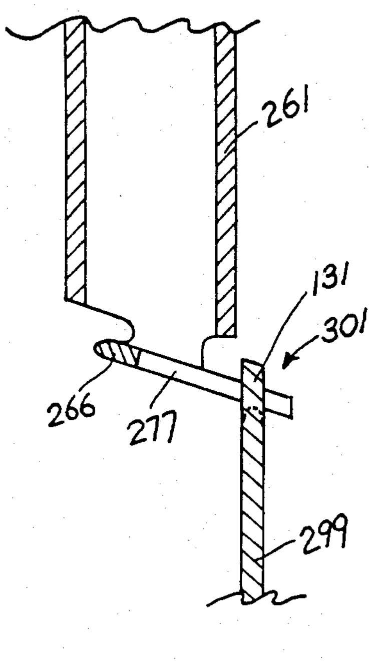
FIG. 17 is a cross sectional view of just the receptacle floor area of the apparatus of FIG. 4 with the bottom housing of FIG. 16 substituted therein, and with the apparatus in a retracted operative position.
Figure 18:
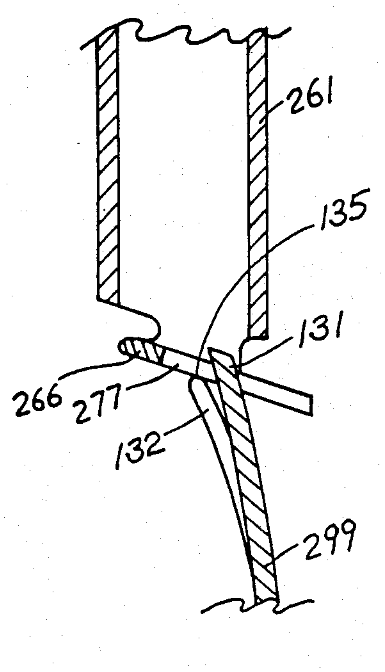
FIG. 18 is a cross sectional view as in FIG. 17, but in an intermediate operative position.
Figure 19:
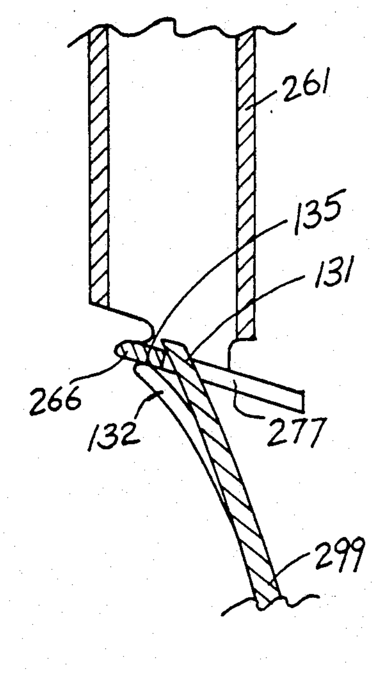
FIG. 19 is a cross sectional view as in FIG. 17, but in an extended operative position.
Figure 20:
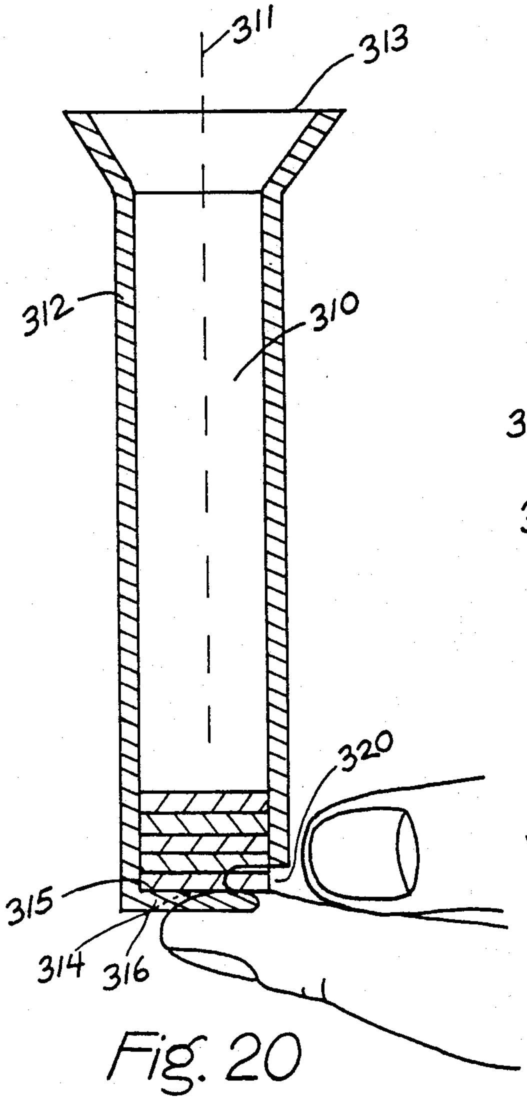
FIG. 20 is a cross sectional view of a manual chip dispenser.
Figure 21:
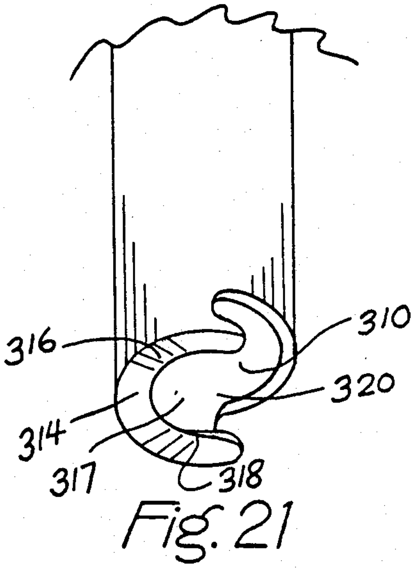
FIG. 21 is a bottom angled isometric view of the apparatus of FIG. 20.
Figure 22:
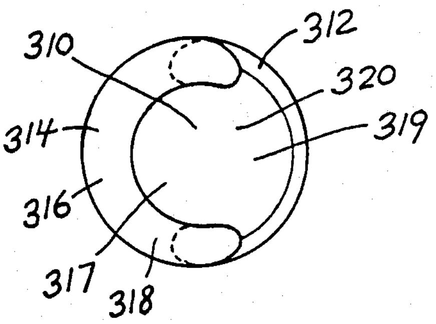
FIG. 22 is a bottom view of the apparatus of FIG. 20.

FIGS. 17 to 19 show pictorially the angular orientation of the flanges 131, 132, and 133 with respect to the floor 266 as the receptacle 261 would be displaced downwardly with respect to the base 262 at progressively greater downward displacements. In FIG. 17, the relationship is shown with no displacement in a retracted operative position with all three flanges 131, 132, and 133 generally aligned. FIG. 18 shows the relationship at an intermediate operative position. As shown therein, as the receptacle 261 moves down with respect to the base 262, the side flanges 132 and 133 slide along the underside of the floor 266 and in so doing tend to more closely approach the angle of the floor 266. However, the central flange is not bound by the underside of the floor 266 and therefore retains more of its straight up and down orientation, with its upper pushing edge at substantially the same height above the floor 266 as in the retracted operative position. FIG. 19 shows the relationship of the flanges 131, 132, and 133 to the floor 266 at an extended operative position. In this position, the side flanges 132 and 133 have almost become parallel with the floor 266, but the central flange 131 remains straighter and retains more of its up and down orientation and again with its upper pushing edge at substantially the same height above the floor 266 as in the retracted and intermediate positions. It is noted that the underside of the floor 266 might be contoured, or the thickness of the floor might be tapered as discussed above, to also contribute to having the pushing edge of the central shuttle flange 131 remain a substantially constant height above the floor 266 at all operative positions, FIGS. 20, 21 and 22 depict a manual chip dispenser. As can best be seen in FIG. 20, the dispenser has a cylindrical receptacle cavity 310 with a central axis 311 defined by a side wall 312 and having an open funnel shaped top 313. The bottom of the dispenser has a flat floor 314 with an upperside surface 315 and underside surface 316 perpendicular to the central axis 311, and with a bottom slot 317 opening large enough to allow a human finger to touch the bottom side of the lowermost chip but small enough to retain a chip in the cavity 310 without falling through, creating a lip 318 partially surrounding the bottom slot opening 317. The lip 318 is discontinuous at one angular location 319. The side wall 312 has an exit opening 320 therethrough adjacent and above the discontinuity in the lip 318. The exit opening 320 extends half way around the sidewall 312 at the bottom and has a height great enough to allow at least one chip to pass therethrough.

In use, the chips are loaded into the top of the receptacle cavity 310. It is sometimes necessary to orient the first chip in so that the chips do not fall through or jam. The receptacle cavity 310 can be reloaded before using the last chip so that subsequent loading operations will be the equivalent of loading into a flat floor receptacle with minimum chance of improper orientation of the chips upon loading. After loaded, a human finger can touch the bottom most chip, and pull one out of the sidewall exit opening 320 by friction. It is noted here that although a flat floor perpendicular to the central axis is depicted, the floor can be angled upwardly toward the sidewall exit opening as previously discussed.

Having described various inventive aspects and embodiments of my invention, I claim:

1. A dispenser for individual ones of flat discs onto a surface in proximity to a second adjacent disc of the same size and shape, comprising:

a housing having a passageway therein and having an opening at a bottom end of the passageway for chips to pass thereoutof onto a surface; and means, including multiple thin prongs distributed around the passageway opening, radially adjacent thereto and below the opening, and having underside faces to contact said surface, to space said housing above said surface when the prong faces are in contact with said surface, and having a substantial gap between adjacent ones of said prongs, with said gap having a vertical height greater than the thickness of the discs to be dispensed, and with sufficient distance between said adjacent prongs to allow the edge of said second adjacent disc to be in a partially overlapping relationship with said housing without contacting said housing when the prongs are in contact with said surface, and wherein the shortest distance between adjacent ones of said prongs is greater than the largest of any linear dimension of said surface contacting faces of said adjacent prongs.

2. The dispenser of claim 1 wherein said prongs are spaced to align in a predetermined relationship with markings on said surface.

3. The dispenser of claim 2 wherein said prongs are spaced to align in a predetermined relationship with corners of a rectangle.

4. The dispenser of claim 2 wherein there are four of said prongs evenly spaced around said opening.

5. The dispenser of claim 4 wherein the housing has generally squared corners at a bottom end around said passageway, and the prongs generally angularly aligned with said corners.

6. The dispenser of any of claims 1, 2, 4, or 5, wherein the prongs are rigidly attached to said housing and are generally aligned with the corners of a rectangle.

7. A device for dispensing flat chips onto a surface, comprising:

a housing having an elongated receptacle cavity therein defined by an inner surface of a sidewall for retaining a supply of multiple ones of said chips in a stack along an axis, a flat floor at a bottom portion thereof, an exit opening in the sidewall adjacent the floor, and a recess in the sidewall adjacent the floor and open to the cavity on the opposed side of the cavity with respect to the exit opening;

a displaceable member slideable with respect to the housing in the direction of the axis between a retracted operative position and an extended operative position;

an elongated slot in the floor generally extending in the direction between the recess in the sidewall and the exit opening therein;

a shuttle slideably retained in said slot and linearly moveable in said slot between a retracted position when the displaceable member is in its retracted position, and an extended position when said displaceable member is in its extended position, and having an upper portion with a leading edge elevated above the floor sufficiently to engage the edg of the bottom chip in the receptacle and move it laterally of the axis toward the exit opening when the displaceable member is moved from its retracted position to its extended position, and wherein the leading edge of the upper portion of the shuttle is in said recess in the sidewall of the .housing, radially outside the inner surface of said sidewall when the displaceable member is in its retracted position; and a pusher, elongated between two ends, one of which ends is attached to the shuttle and the other end of which is attached to the displaceable member.

8. The device of claim 7 wherein the housing further comprises a smoothly curved elongated channel open to the recess in the sidewall and through which the pusher extends in close but slideable relation therein.

9. The device of claim 8 wherein the slot in the floor extends from the recess only part way thereacross, terminating short of the exit opening.

10. The device of claim 7 wherein the displaceable member is generally concentric with said axis and at least partially encircles the cavity.

11. The device of claim 10 wherein the housing further comprises a smoothly curved elongated channel open to the recess in the sidewall and through which the pusher extends in close but slideable relation therein.

12. The device of any of claims 7, 8, 9, 10 or 11 wherein the housing has a passageway therein below the floor and open at a bottom end for chips to pass thereoutof onto a surface; and Multiple thin prongs rigidly attached to and distributed around the housing radially adjacent to and below the open bottom end of the passageway, and are of sufficient length to create a gap between adjacent ones of them when in contact with a surface so as to allow the edges of a chip to pass freely under said housing in at least a partially overlapping relationship thereto.

13. The device of claim 12 wherein there are four of said prongs.

14. A device for dispensing flat chips onto a surface, comprising:

a housing having an elongated receptacle cavity therein defined by an inner surface of a sidewall for retaining a supply of multiple ones of said chips in a stack along an axis;

a flat floor at a bottom portion of the cavity with an upperside surface and a underside surface;

wherein the sidewall has an exit opening adjacent the floor and centered at a first angular position about the axis, and a recess open to the cavity adjacent the floor and centered at a second opposed angular position about the axis;

and which further comprises:

a displaceable member slideable in the direction of the axis with respect to the housing between a retracted operative position and an extended operative position;

a shuttle moveable in response to movement of the displaceable member between a retracted position when the displaceable member is in its retracted position, and an extended position when the displaceable member is in its extended position, and being effective to move the bottom chip in the receptacle laterally of the axis toward the exit opening when the displaceable member is moved from its retracted position to its extended position; and a pusher which operatively engages the shuttle and is attached to the displaceable member;

and wherein the floor has an elongated slot generally extending in the direction between the recess in the sidewall and the exit opening therein, and wherein the shuttle is slideably retained in the slot.

15. The device of claim 14 wherein at least one of said floor surfaces is angled from the perpendicular with respect to said axis and slanting upwardly from said first angular position about the axis to said opposed second angular position about the axis.

16. The device of claim 15 wherein the underside of the floor is angled; and the shuttle is fixedly secured to the end of the pusher, has a shoulder which engages and slides along the underside of the floor during use, and comprises a flange which extends through the slot and engages and laterally moves the bottom chip in said stack during use.

17. The device of claim 15 wherein the slot in the floor extends from the recess only part way thereacross, terminating short of the exit opening.

18. A device for dispensing flat chips onto a surface, comprising:

a housing having an elongated receptacle cavity therein defined by an inner surface of a sidewall for holding a supply of multiple ones of said chips in a stack along an axis, a floor at a bottom portion of the receptacle cavity and having a flat upperside surface and an underside surface, an exit opening in the sidewall adjacent the floor at a first angular position about the axis, and a recess in the sidewall adjacent the floor and open to the cavity at an opposed second angular position about the axis;

a displaceable member slideable in the direction of the axis with respect to the housing between a retracted operative position and an extended operative position;

a shuttle having upper and lower portions, and moveable along the flat upperside surface of the floor between a retracted position when the displaceable member is in its retracted position, and an extended position when said displaceable member is in its extended position and effective to move a chip laterally of the axis toward the exit opening when the displaceable member is moved from its retracted position to its extended position, and a pusher, elongated between two ends, a first of which ends has a shoulder which slideably engages the underside surface of the floor and is displaced therefrom toward the exit opening in the sidewall when the displaceable member is moved toward its extended position.

19. The device of claim 18 wherein the second end of the pusher is attached to the displaceable member.

20. The device of claim 19 wherein the first end of the pusher engages the shuttle.

21. The device of claim 20 wherein the shoulder on the first end of the pusher engages the bottom portion of the shuttle.

22. The device of claim 21 wherein the shoulder on the first end of the pusher pivotally engages the bottom portion of the shuttle.

23. The device of claim 22 wherein the shoulder on the first end of the pusher comprises a flange;

the shuttle comprises a loop on its underside; and wherein the flange is moveably retained in the loop on the shuttle.

24. The device of claim 19 wherein the pusher is generally aligned with the axis when the displaceable member is in its retracted operative position.

25. The device of claim 24 wherein the pusher is resilient and in spring tension engagement with said floor during use.

26. The device of claim 25 wherein the first end of the pusher engages the lower portion of the shuttle.

27. The device of claim 26 wherein the shuttle is fixedly secured to the end of the pusher.

28. The device of claim 26 wherein the first end of the pusher is pivotally attached to the lower portion of the shuttle.

29. The device of claim 26 wherein the shoulder on the first end of the pusher comprises a flange;

the shuttle comprises a loop on its underside; and wherein the flange is moveably retained in the loop on the shuttle.

30. The device of claim 20 wherein the floor has a slot generally extending in the direction between the recess in the sidewall and the exit opening therein, and wherein the shuttle is slideably retained in said slot.

31. The device of claim 30 wherein the shuttle has an upper portion with a leading edge elevated above the floor sufficiently to engage the edge of a bottom chip in the receptacle and move it laterally of the axis toward the exit opening when the displaceable member is moved from its retracted position to its extended position, and wherein the leading edge of the upper portion of the shuttle is in said recess in the sidewall of the housing, radially outside the inner surface of said sidewall, when the displaceable member is in its retracted position.

32. The device of claim 31 wherein the pusher is generally flat; and wherein the end of the pusher distal to the point where it is attached to the displaceable member further comprises:

multiple elongated flanges wherein:

a first flange is longer than a second flange, comprises the shuttle and extends upward through the slot in the floor sufficient to engage the edge of the bottom most chip in the stack;

a distal end of the second flange comprises the shoulder that engages the underside of the floor;

each of said flanges are joined at a location on the pusher intermediate between the end attached to the displaceable member and the end comprising the shuttle.

33. The device claim 31 wherein the pusher is generally aligned with the axis when the displaceable member is in its retracted operative position.

34. The device of claim 33 wherein the displaceable member: generally at least partially encircles the housing, and is slideably moveable and generally concentric with respect thereto; has a passageway therein which is open at an upper end to the exit opening in the sidewall of the housing; and has an opening at a lower end through which a dispensed chip falls onto a surface;

and wherein the pusher is attached to the displaceable member at a location between the bottom opening and the floor of the housing.

35. The device of claim 33 wherein the shuttle is fixedly secured to the end of the pusher and comprises a flange extending through said slot.

36. The device of claim 33 wherein the first end of the pusher is pivotally attached to the lower portion of the shuttle; and the pusher is resilient and in spring tension engagement with the floor during use.

37. The device of claim 36 wherein the shoulder on the first end of the pusher comprises a flange;

the shuttle comprises a loop on its underside; and wherein the flange is moveably retained in the loop on the shuttle.

38. The device of claim 31 wherein the pusher is resilient and in spring tension engagement with said floor during use, and wherein the first end of the pusher is pivotally attached to the lower portion of the shuttle.

39. The device of claim 38 wherein the shoulder on the first end of the pusher comprises a flange;

the shuttle comprises a loop on its underside; and wherein the flange is moveably retained in the loop on the shuttle.

40. The device of claim 19 wherein the displaceable member: generally at least partially encircles the housing, and is slideably moveable and generally concentric with respect thereto; has a passageway therein which is open at an upper end to the exit opening in the sidewall of the housing; and has an opening at a lower end through which a dispensed chip falls onto a surface;

and wherein the pusher is attached to the displaceable member at a location between the bottom opening and the floor of the housing.

41. The device of claim 40 wherein the pusher is resilient and in spring tension engagement with said floor during use.

42. The device of claim 41 wherein the first end of the pusher engages the lower portion of the shuttle.

43. The device of claim 42 wherein the shuttle is fixedly secured to the end of the pusher.

44. The device of claim 42 wherein the first end of the pusher is pivotally attached to the lower portion of the shuttle.

45. The device of claim 44 wherein the shoulder on the first end of the pusher comprises a flange;

the shuttle comprises a loop on its underside; and wherein the flange is moveably retained in the loop on the shuttle.

46. The device of claim 19 wherein the pusher is resilient and in spring tension engagement with said floor during use.

47. The device of claim 46 wherein the pusher is generally aligned with the axis when the displaceable member is in its retracted operative position, and wherein the floor has an elongated slot generally extending in the direction between the recess in the sidewall and the exit opening therein.

48. The device of claim 47 wherein the displaceable member: generally at least partially encircles the housing, and is slideably moveable and generally concentric with respect thereto; has a passageway therein which is open at an upper end to the exit opening in the sidewall of the housing; and has an opening at a lower end through which a dispensed chip falls onto a surface;

and wherein the pusher is attached to the displaceable member at a location between the bottom opening and the floor of the housing.

49. The device of claim 47 wherein the shuttle is slideably retained in said slot; and wherein the shuttle has an upper portion with a leading edge elevated above the floor sufficiently to engage the edge of the bottom chip in the receptacle and move it laterally of the axis toward the exit opening when the displaceable member is moved from its retracted position to its extended position, and wherein the leading edge of the upper portion of the shuttle is in said recess in the sidewall of the housing, radially outside the inner surface of said sidewall, when the displaceable member is in its retracted position.

50. The device of any of claims 18, 19, 20, 22, 23, 40, 41, 26, 27, 42, 43, 28, 29, 30, 31, 36, 37, 35, 38, 39, 46, 48, or 49:

wherein the underside surface of the floor is angled from the perpendicular with respect to said axis and slanting upwardly from said first angular position to said second angular position; and wherein the shuttle is at least partially in the recess when the displaceable member is in its retracted position.

51. The device of claim 50 wherein both the upperside surface and underside surface are each angled from the perpendicular with respect to said axis and slanting upwardly from said first angular position to said second angular position.

52. The device of any of claims 14, 15, 18, 19, 20, 24, 25, 26, 27, 43, 30, 31, 33, 35, or 46 to 49 inclusive, wherein the underside surface of the floor is angled from the perpendicular with respect to the axis; and the thickness of the floor between the upperside surface and underside surface decrease from a thicker portion closer to the recess to a thinner portion closer to the exit opening.

53. The device of claims 16, 27, 34, or 35 wherein the shuttle has a foreward chip pushing edge which is angled toward the exit opening when engaging a chip, from a lower portion to an upper portion such that said upper portion is closer to the exit opening than said lower portion.

54. A method of depositing flat chips onto a surface comprising the steps of:

loading a receptacle with multiple ones of said chips;

placing underside surface-contacting faces of multiple prongs in contact with said surface at angularly distributed points around a location on the surface at which a chip is to be deposited;

locating a substantial gap between adjacent ones of said prongs at the surface, the gap having sufficient height and spacing between said adjacent prongs to allow the edge of one of said chips to enter thereinto, and wherein the gap has a greater angular spacing between adjacent ones of said prongs than the largest angular dimension of the underside surface-contacting faces of said adjacent prongs;

exerting downward force on said surface through said prongs; and moving a displaceable member responsive to said force from a first to a second operative position along a vertical axis.

55. The method of claim 54 which further comprises the step of placing 4 prongs in contact with said surface.

56. The method of claim 54 which further comprises the step of aligning said prongs in a predetermined relationship with respect to markings on said surface.

57. The method of claim 56 which further comprises the step of guiding a chip through an opening generally central to said prongs.

58. The method of claim 57 wherein the markings comprise a playing square on a bingo card.

59. A method of dispensing flat chips onto a receiving surface comprising the steps of:

hand holding a receptacle with multiple ones of said chips in a stack along an axis and supported by a floor with an upper side and lower side surface, at least one of which is angled from the perpendicular with respect to said axis;

exerting downward force on said receiving surface through said receptacle and moving a displaceable member at least partially responsive to said force and to said angled floor surface from a first to a second operative position in the direction of said axis, and then back to said first operative position;

displacing a chip laterally from said axis in response to the moving of said displaceable member;

and wherein the step of displacing the chip further comprises the step of displacing a shuttle in a slot in the floor.

60. The method of claim 59 wherein the step of displacing the shuttle further comprises the step of flexing a leaf spring, a distal end of which engages the shuttle.

61. The method of claim 60 wherein the step of moving the displaceable member comprises the step of compressing two telescopically joined members through both of which the chip passes.

62. A method of dispensing flat chips onto a receiving surface at a desired location comprising the steps of:

hand holding a receptacle with multiple ones of said chips in a stack in a receptacle cavity therein along an axis, and with said chips supported by a floor with an upperside and underside surface;

exerting downward force on said receiving surface through said receptacle;

moving a displaceable member responsive to said force from a first to a second operative position in the direction of said axis;

moving an elongated substantially rigid but flexible pusher attached to said displaceable member through a smoothly curved channel open to said cavity adjacent and just above the upperside surface of said floor; and displacing a chip, in response to the moving of said displaceable member, laterally from said axis into a passageway with an opening at the bottom thereof which is directly above said desired location on the receiving surface, and wherein the step of displacing the chip comprises the step of displacing a shuttle attached to said pusher and slideably retained in a slot in the floor.

63. The method of claim 62 which further comprises the steps of:

passing said chip through passages in both the displaceable member and the receptacle.

64. A device for dispensing flat chips onto a surface, comprising:

a housing having a receptacle cavity therein defined by an inner surface of a sidewall for retaining a supply of multiple ones of said chips;

a displaceable member slideable with respect to the housing along an axis between a retracted operative position and an extended operative position;

a flat floor at a bottom portion of the cavity with an upperside surface and a underside surface, and the underside surface angled from the perpendicular with respect to said axis and slanting upwardly from a first angular position about the axis to an opposed second angular position about the axis, an elongated pusher spring with a first end attached to the displaceable member at a location below the floor and angularly aligned with said first angular position about the axis and a second end distal to the end attached to the displaceable member which slideably engages the underside surface of the floor in spring tensioned engagement therewith and slides therealong when the displaceable member is moved between its retracted position and its extended position.

65. The device of claim 64 wherein the sidewall has an exit opening above and adjacent the floor at said first angular position.

66. The device of claim 65 wherein the chips are retained in a stack along said axis and which further comprises means through which the spring engages the floor, moveable in response to movement of the displaceable member, and effective to move the bottom chip in the receptacle laterally of the axis toward the exit opening when the displaceable member is moved from its retracted position to its extended position.

* * * * *